US012561210B1

(12) United States Patent
Thomaiyar et al.

(10) Patent No.: US 12,561,210 B1
(45) Date of Patent: Feb. 24, 2026

(54) DATA BACKUP AND RECOVERY USING CACHE-COHERENT INTERCONNECT NODE-BASED NON-VOLATILE MEMORY

(71) Applicant: Microsoft Technology Licensing, LLC, Redmond, WA (US)

(72) Inventors: Richard Marian Thomaiyar, Karnataka (IN); Ankur Garg, Redmond, WA (US); Karunakara Kotary, Redmond, WA (US); Pannerkumar Rajagopal, Karnataka (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/812,684

(22) Filed: Aug. 22, 2024

(51) Int. Cl.
 *G06F 11/14* (2006.01)
 *G06F 1/26* (2006.01)
 *G06F 1/30* (2006.01)
(52) U.S. Cl.
 CPC .......... *G06F 11/1458* (2013.01); *G06F 1/263* (2013.01); *G06F 1/30* (2013.01); *G06F 2201/805* (2013.01)
(58) Field of Classification Search
 CPC ........ G06F 11/1458; G06F 1/263; G06F 1/30; G06F 2201/805
 See application file for complete search history.

(56) References Cited

U.S. PATENT DOCUMENTS

| | | | | |
|---|---|---|---|---|
| 2017/0019350 A1* | 1/2017 | Fahim | .................. | H04L 49/103 |
| 2019/0243759 A1* | 8/2019 | Stonelake | ............. | G06F 3/0673 |
| 2020/0151104 A1* | 5/2020 | Yang | .................. | G06F 13/4282 |
| 2023/0273731 A1* | 8/2023 | Ki | ........................ | G06F 11/1441 |
| 2024/0134757 A1* | 4/2024 | Steed | ...................... | G06F 1/263 |
| 2024/0281275 A1* | 8/2024 | Muthupandi | ....... | G06F 9/45558 |

* cited by examiner

*Primary Examiner* — Bryce P Bonzo
*Assistant Examiner* — Xinyuan Yu

(57) ABSTRACT

Systems and methods are provided for implementing data backup and recovery using cache-coherent interconnect node-based non-volatile memory. A cache-coherent interconnect node partitions a memory pool into a plurality of memory regions as well as a backup storage into a plurality of memory portions, and pre-allocates a memory region and a corresponding memory portion to each compute node. When a rack-level power loss occurs, and a battery-based power source is activated, a cache-coherent interconnect controller saves data from each memory region into the corresponding memory portion, and subsequently saves an entry for each memory portion in an index portion of the backup storage. Subsequently, the controller causes a power circuitry to shut down the backup power source. After rack-level power restoration and memory region initialization, the controller restores, for each memory region, the data saved in a corresponding memory portion into that memory region, based on information in a corresponding entry.

20 Claims, 7 Drawing Sheets

200A

200B

200C

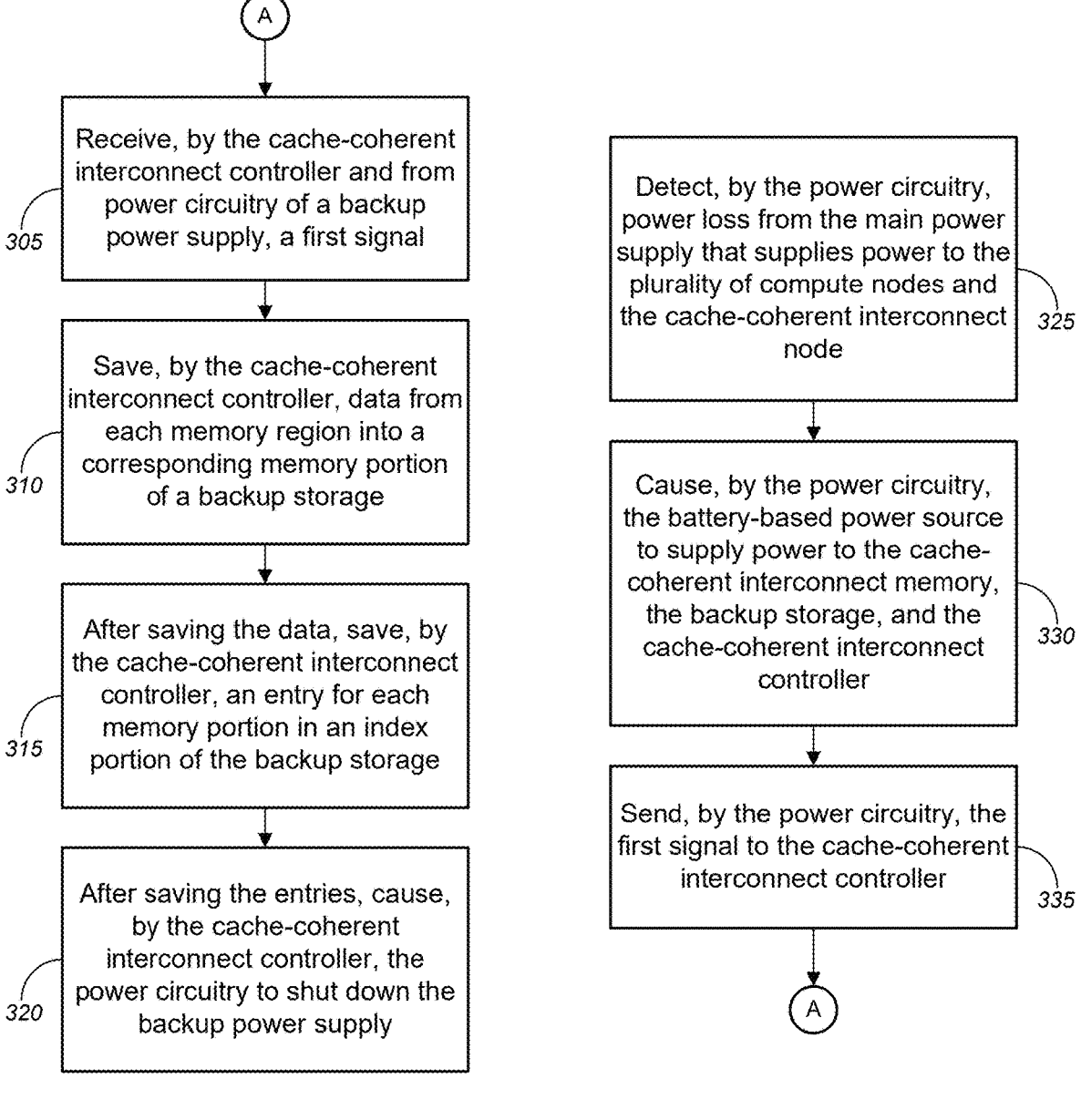

(A)

Receive, by the cache-coherent interconnect controller and from power circuitry of a backup power supply, a first signal

305

Save, by the cache-coherent interconnect controller, data from each memory region into a corresponding memory portion of a backup storage

310

After saving the data, save, by the cache-coherent interconnect controller, an entry for each memory portion in an index portion of the backup storage

315

After saving the entries, cause, by the cache-coherent interconnect controller, the power circuitry to shut down the backup power supply

320

Detect, by the power circuitry, power loss from the main power supply that supplies power to the plurality of compute nodes and the cache-coherent interconnect node

325

Cause, by the power circuitry, the battery-based power source to supply power to the cache-coherent interconnect memory, the backup storage, and the cache-coherent interconnect controller

330

Send, by the power circuitry, the first signal to the cache-coherent interconnect controller

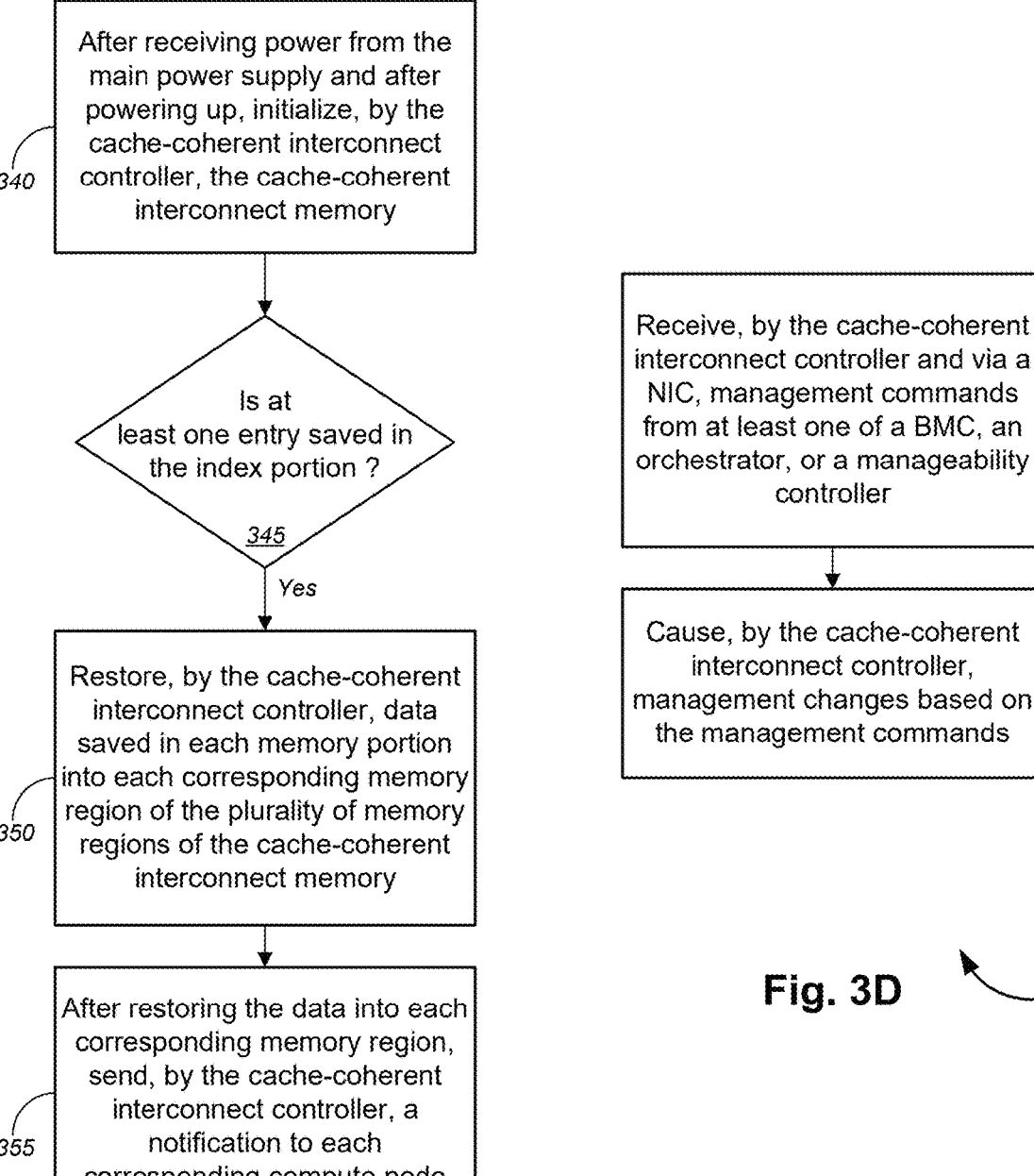

340 — After receiving power from the main power supply and after powering up, initialize, by the cache-coherent interconnect controller, the cache-coherent interconnect memory Is at least one entry saved in the index portion ?

345

Yes

350 — Restore, by the cache-coherent interconnect controller, data saved in each memory portion into each corresponding memory region of the plurality of memory regions of the cache-coherent interconnect memory 355 — After restoring the data into each corresponding memory region, send, by the cache-coherent interconnect controller, a notification to each corresponding compute node 360 — Receive, by the cache-coherent interconnect controller and via a NIC, management commands from at least one of a BMC, an orchestrator, or a manageability controller 365 — Cause, by the cache-coherent interconnect controller, management changes based on the management commands Fig. 3D          ↖ 300

300 — ↗ Fig. 3C

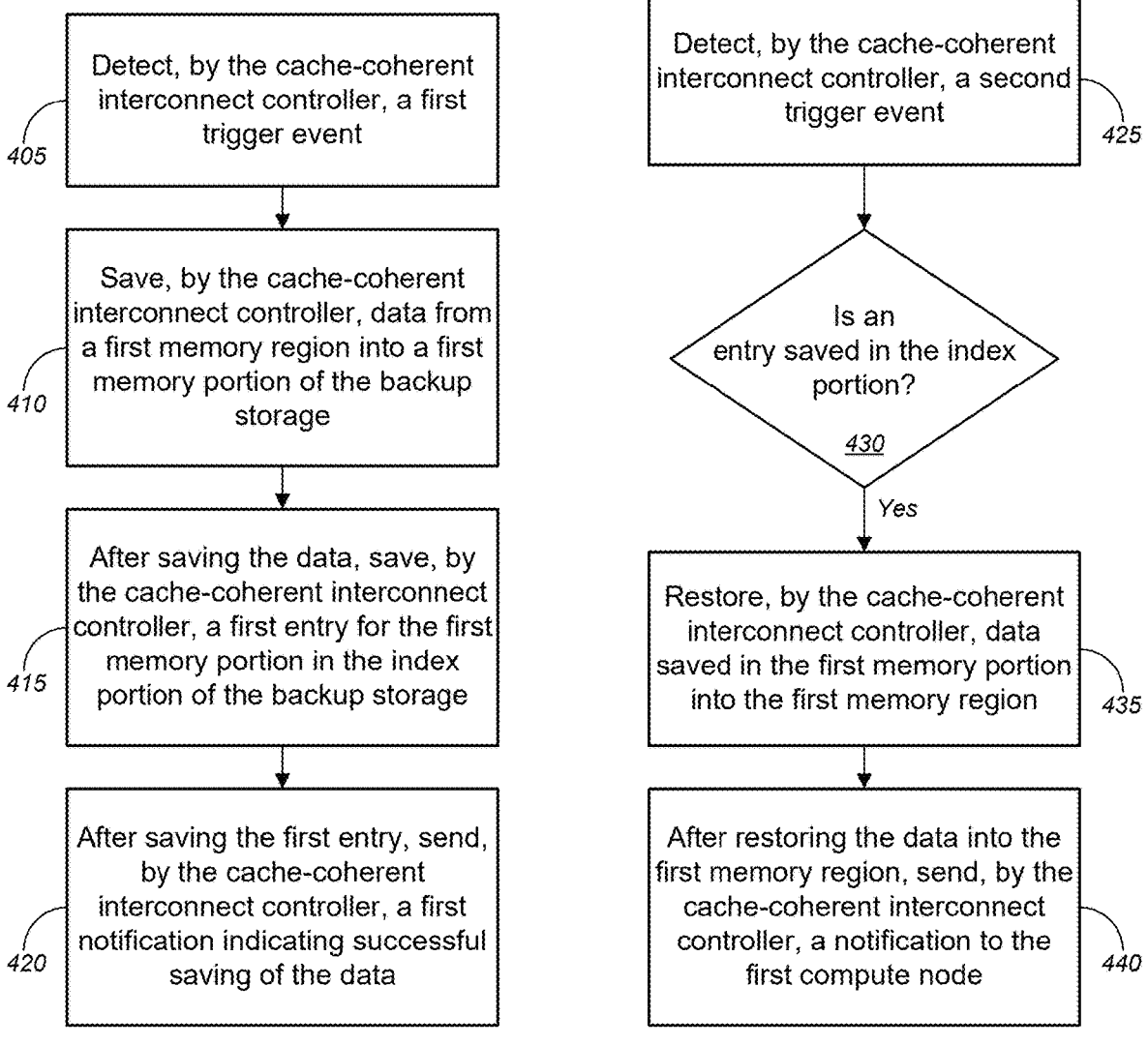

405 — Detect, by the cache-coherent interconnect controller, a first trigger event 410 — Save, by the cache-coherent interconnect controller, data from a first memory region into a first memory portion of the backup storage 415 — After saving the data, save, by the cache-coherent interconnect controller, a first entry for the first memory portion in the index portion of the backup storage 420 — After saving the first entry, send, by the cache-coherent interconnect controller, a first notification indicating successful saving of the data 425 — Detect, by the cache-coherent interconnect controller, a second trigger event 430 — Is an entry saved in the index portion?

Yes

435 — Restore, by the cache-coherent interconnect controller, data saved in the first memory portion into the first memory region 440 — After restoring the data into the first memory region, send, by the cache-coherent interconnect controller, a notification to the first compute node 400 — Fig. 4A

DATA BACKUP AND RECOVERY USING CACHE-COHERENT INTERCONNECT NODE-BASED NON-VOLATILE MEMORY

BACKGROUND

In data centers, when power loss occurs, data in a cache-coherent interconnect memory of a cache-coherent interconnect node that is associated with and/or being used by a compute node(s) that is communicatively coupled to the cache-coherent interconnect node can be lost. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for data backup and recovery using cache-coherent interconnect node-based non-volatile memory. In examples, a cache-coherent interconnect node is communicatively coupled via cache-coherent interconnect links with each compute node of a plurality of compute nodes. The cache-coherent interconnect links are pretrained, and the cache-coherent interconnect node partitions a memory pool into a plurality of memory regions and pre-allocates a memory region among the plurality of memory regions to each compute node. The cache-coherent interconnect node further partitions a backup storage into a plurality of memory portions and an index portion, and pre-allocates a memory portion among the plurality of memory portions to each compute node. The cache-coherent interconnect node further includes a controller and a backup power supply including power circuitry and a battery-based power source. The controller receives a first signal from the power circuitry indicating rack-level power loss and indicating that power is currently being supplied by the battery-based power source. The controller subsequently saves data from each memory region of the plurality of memory regions into a corresponding memory portion among the plurality of memory portions of the backup storage. Thereafter, the controller saves an entry for each memory portion in the index portion of the backup storage, each entry including information (e.g., metadata) indicating which memory region or which compute node the data corresponds to. Subsequently, the controller causes the power circuitry to shut down the backup power source. After rack-level power restoration, the controller initializes the memory regions of the memory pool, then checks for entries in the index portion of the backup storage. For each entry, the controller restores the data saved in that memory portion into a corresponding memory region of the plurality of memory regions of the cache-coherent interconnect memory, based on the information (e.g., metadata) included in that entry. Subsequently, the controller sends a notification to each corresponding compute node indicating that the data has been restored and/or that the data and the memory region are ready for use by the compute node. In this manner, data persistence is assured for data stored in cache-coherent interconnect memory, in spite of rack-level power loss.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3A-3D depict an example method for implementing data backup and recovery using cache-coherent interconnect node-based non-volatile memory.

FIGS. 4A and 4B depict another example method for implementing data backup and recovery using cache-coherent interconnect node-based non-volatile memory.

DETAILED DESCRIPTION OF CERTAIN EMBODIMENTS

Figure 1:
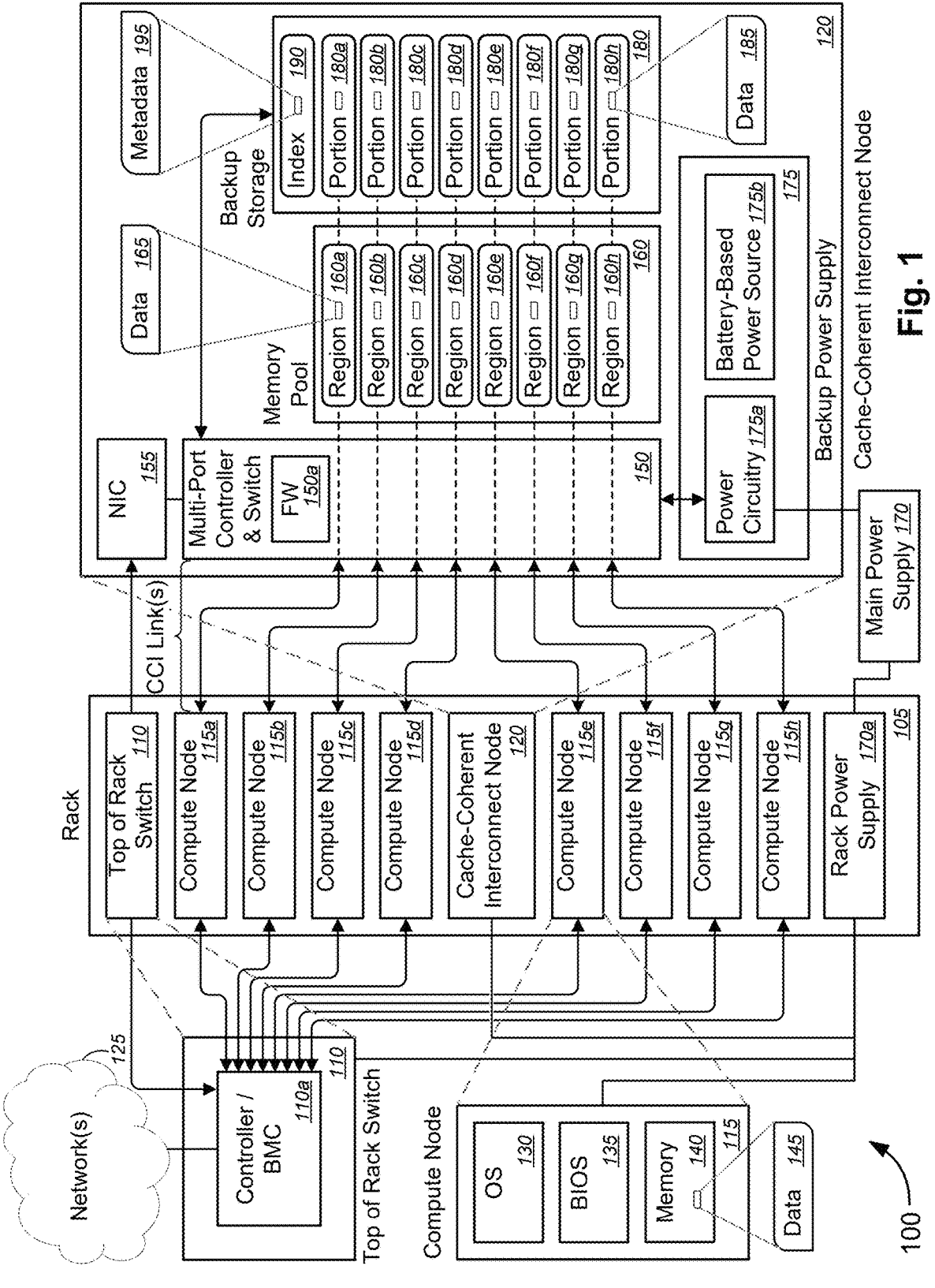
FIG. 1 depicts an example system for implementing data backup and recovery using cache-coherent interconnect node-based non-volatile memory.

Non-Volatile Dual In-line Memory Module ("NVDIMM") feature that is used in software is gaining traction in the storage industry. Despite its growing popularity, the current implementation of the software NVDIMM feature presents several challenges. One challenge is that the existing solution is dependent on battery backup at the node level, as it emulates NVDIMM functionalities using the node's local Double Data Rate ("DDR") memory. This reliance poses a potential risk to data integrity and availability, as power loss at the node level results in data loss by the local DDR memory. Another challenge is that the existing solution is fragmented due to divergences specific to host central processing unit ("CPU") architectures. For instance, Intel® and AMD® utilize a Basic Input/Output System ("BIOS") for NVDIMM DDR save and/or restore operations, while Arm and Data Processing Unit ("DPU") employ a microcontroller-based save and/or restore solution. This fragmentation results in a lack of uniformity across different architectures, thereby impeding the scalability of the existing solution. Yet another challenge is that, because any node level failure results in data loss, maintenance becomes a nightmare to manage and issues with total cost of ownership ("TCO") arise. TCO includes infrastructure costs, support costs, software licensing costs, data storage costs, network bandwidth costs, and personnel expenses. In the case of data loss due to node level failure, at least infrastructure costs (e.g., due to backup systems for each compute node), support costs (e.g., for installing, connecting, and maintaining node level backup systems), and personnel expenses (e.g., for working on installing, connecting, and maintaining CPU-architecture dependent systems that may be different for different nodes) would be increased to address the data loss and to address the node level failure as a whole.

The present technology provides for a system(s) and a method(s) for implementing data backup and recovery using cache-coherent interconnect node-based non-volatile memory. The present technology utilizes a cache-coherent interconnect node-level battery backup, instead of multiple compute node level battery backup. Rack level power loss or power restoration is the trigger for performing save or restore operations, respectively, instead of compute node level power loss or recovery. The cache-coherent interconnect node-based save and restore operations are independent of CPU architectures, as they are activated automatically based on rack level power loss and power restoration, respectively. In this manner, a scalable solution is enabled that is agnostic of host CPU architectures, and can work and scale well on any compute design and any rack design, with the usage of the cache-coherent interconnect memory pool. TCO is reduced compared with the existing solution, due to battery backup being used in a single node (e.g., the cache-coherent interconnect node) instead of in each compute node, and due to the present implementation being agnostic of host CPU architectures, which simplifies installation, connection, and maintenance (and thus lowers their associated costs). In sum, the present technology provides a cache-coherent interconnect node NV memory solution for data backup and recover that is unified, scalable, and reliable, and that improves the overall functionality and efficiency of the system.

Various modifications and additions can be made to the embodiments discussed herein without departing from the scope of the disclosed techniques. For example, while the embodiments described above refer to particular features, the scope of the disclosed techniques also includes embodiments having different combinations of features and embodiments that do not include all of the above-described features.

Turning to the embodiments as illustrated by the drawings, FIGS. 1-5 illustrate some of the features of methods, systems, and apparatuses for implementing data backup and recovery using cache-coherent interconnect node-based non-volatile memory, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

FIG. 1 depicts an example system 100 for implementing data backup and recovery using cache-coherent interconnect node-based non-volatile memory. System 100 includes a rack 105, a top of rack ("ToR") switch 110, a plurality of compute nodes 115a-115h ((collectively, "compute nodes 115"), a cache-coherent interconnect node 120 (e.g., a compute express link ("CXL") node, a coherent accelerator processor interface ("CAPI") device, a cache coherence interconnect for accelerators ("CCIX") device), and a network(s) 125. The ToR switch 110, the compute nodes 115, and the cache-coherent interconnect node 120 are disposed on the rack 105 (also referred to as an "equipment rack"), which is disposed in a data center or other service provider facility. The ToR switch 110 includes a controller 110a, such as a baseboard management controller ("BMC"). Each compute node 115 includes an operating system ("OS") 130, a BIOS 135, and memory 140 (also referred to herein as "local memory"). Data 145 can be stored on the memory 140.

The cache-coherent interconnect node 120 includes a multi-port controller and switch 150 (also referred to herein as "controller 150" or "cache-coherent interconnect controller 150"), a network interface card ("NIC") 155, and a memory pool 160 (also referred to herein as "shared memory 160" or "cache-coherent interconnect memory 160"). The controller 150 is communicatively coupled with each of the compute nodes 115 (as denoted in FIG. 1 by the double-headed arrows (referred to herein as "cache-coherent interconnect links" or "CCI link(s)") between the controller 150 and each compute node 115). The cache-coherent interconnect node 120 implements cache-coherent interconnect specifications that allow for a memory pooling architecture in which the memory pool 160 can be shared by the compute nodes 115a-115h in the rack 105. In examples, the controller 150 includes controller firmware 150a. The controller 150 or the controller firmware 150a enforces hardware cache coherency, which allows the compute nodes 115a-115h in the rack 105 to have a coherent copy of the shared memory (e.g., memory pool 160).

The memory pool 160 is partitioned into a plurality of memory regions 160a-160h each pre-allocated to one of the plurality of compute nodes 115a-115h (as denoted in FIG. 1 by the dashed line between each memory region 160 and a corresponding cache-coherent interconnect link connecting a corresponding compute node 115 to the controller 150). In some examples, the memory pool 160 is formed from or includes a plurality of memory devices that are pooled together. For each compute node, OS 130 or BIOS 135 can save data in a corresponding memory region among the memory regions 160a-160h, as data 165.

System 100 further includes a main power supply 170 that supplies electrical power to the rack 105. In some examples, the main power supply 170 includes an electrical outlet that is electrically coupled to an electrical power grid (e.g., a municipal power grid, a regional power grid, and/or a national power grid), to a transformer, to an onsite renewable energy generation system, to an onsite hydrocarbon-based power generator (e.g., a gasoline, propane, kerosene, or diesel-based power generator), and/or to one or more electrical power storage batteries. In examples, the onsite renewable energy generation system includes at least one of a solar power generation system, a wind power generation system, a geothermal power generation system, or a hydro-power generation system, and includes corresponding power generation equipment and a corresponding electrical storage battery(ies). In some examples, the rack 105 further includes a rack power supply 170a that is mounted on the rack 105, that connects to the main power supply 170, and that supplies electrical power to the ToR switch 110, to each compute node 115, and to the cache-coherent interconnect node 120 (in some cases, transforming a high voltage power (e.g., 600 or 480 volts-alternating current (VAC) to a lower voltage power (e.g., 208 or 120 VAC).

In some examples, the cache-coherent interconnect node 120 further includes a backup power supply 175, which includes power circuitry 175a and a battery-based power source 175. The cache-coherent interconnect node 120 further includes a backup storage system 180 including a plurality of memory portions 180a-180h and an index portion 190. The controller 150 is communicatively coupled with the backup storage system 180 (as denoted in FIG. 1 by the double-headed arrow between the controller 150 and the backup storage system 180). The plurality of memory portions 180a-180h is each pre-allocated to one of the plurality of compute nodes 115a-115h and/or to a corresponding one of the plurality of memory regions 160a-160h (as denoted in FIG. 1 by the dashed line between each memory region 160a-160h and a corresponding one of the memory portions 180a-180h). In some examples, the memory portions 180a-180h are formed from or includes one or more non-volatile ("NV") memory devices. In examples, data 165 that is saved in memory regions 160a-160h is backed up and saved in corresponding memory portions 180a-180h as data 185 by controller 150, in response to one or more first trigger events. The controller 150 subsequently saves metadata 195 including information indicating which memory region 160a-160h or which compute node 115a-115h the data 185 corresponds to, information indicating an amount of data 185 being stored, information indicating address ranges for the data 185 in the corresponding memory portion 180a-180h, and/or information indicating address ranges for the corresponding memory portion 180a-180h. In some examples, the one or more first trigger events for saving or backing up the data 165 in memory region(s) 160a-160h into corresponding memory portion(s) 180a-180h includes:

(A) a platform reset associated with at least one compute node 115a-115h;

(B) a node level crash associated with the at least one compute node 115a-115h;

(C) a system crash associated with an OS 130 of the at least one compute node 115a-115h;

(D) at least a portion of the at least one compute node 115a-115h entering a repair state; (E) power loss from the main power supply 170 to at least one compute node 115a-115h; and/or (F) receiving backup instructions from the OS 130 of at least one compute node 115a-115h.

As used herein, a repair state refers to a state in which the compute node is shut down and a request is made to the service provider to assign a technician(s) or other specialist(s) to diagnose and repair issues with the compute node. This is typically a time-consuming process due to manual involvement and results in the compute node being non-operational or non-usable during the repair state. In a similar (or reverse) manner, data 185 is restored from memory portion(s) 180a-180h to memory regions 160a-160h as data 165 in response to one or more second trigger events, including:

(I) a restart of the at least one compute node 115a-115h following one of a platform reset associated with the at least one compute node 115a-115h, a node level crash associated with at least one compute node 115a-115h, a system crash associated with an OS 130 of the at least one compute node 115a-115h, or at least a portion of the at least one compute node 115a-115h entering a repair state;

(II) power up of the at least one compute node 115a-115h following power loss from the main power supply 170 to at least one compute node 115a-115h; or (III) receiving restore instructions from the OS 130 of at least one compute node 115a-115h.

In examples, memory 140 includes at least one of a plurality of dual in-line memory modules ("DIMMs") or a plurality of DDR memory devices. In some examples, such as for specialized jobs like In-Memory Databases ("IMDB"), the compute nodes 115 can support VHM configurations, including 8-12 memory channels each supporting one or two DIMMs, with a DIMM size between about 128 and about 512 gigabytes (GB) for a total memory size of about 2-12 terabytes (TB) per compute node 115. In examples, the plurality of memory devices that form the memory pool 160 includes at least one of a random access memory ("RAM"), a static RAM ("SRAM"), a dynamic RAM ("DRAM"), a synchronous dynamic RAM ("SDRAM"), a DDR memory, a graphics DDR ("GDDR") memory, or a GDDR SDRAM. In some examples, the memory pool 160 utilizes a drive architecture, such as a Just a Bunch of Drives/Disks ("JBOD") architecture, a Concatenation architecture (like SPAN or BIG), and/or a Massive Array of Idle Drives ("MAID") architecture, that uses multiple physical disk drives (in this case, the plurality of memory devices) either as individual independent physical disk drives or as a single combined logical disk. JBOD uses a volume manager or a device-spanning filesystem to cause multiple hard drives to be treated independently or to be combined into one or more logical volumes. SPAN or BIG cause drives (regardless of whether or not they are similar in size or capacity) to be concatenated, with the start of disk of one drive being concatenated to the end of disk of another drive and so on. MAID uses hundreds to thousands of hard drives to provide nearline storage (which is an intermediate type of storage between online storage and offline storage) of data that increases storage density and lowers costs, electrical power, and cooling requirements, at the cost of increased latency, lower throughput, and decreased redundancy. In examples, the one or more NV memory devices include one or more NVDIMMs or one or more NVDDR memory devices. Like the memory pool 160, the backup storage system 180, in some examples, uses a similar drive architecture (e.g., JBOD, SPAN or BIG, and/or MAID) to cause multiple drives (in this case, the one or more NV memory devices) to be treated independently or to be combined into one or more logical volumes. The save and restore functionalities described above and with respect to FIGS. 2A-4B below operate independent of any particular CPU architecture, as they are activated automatically based on rack-level power loss and power restoration, respectively.

The controller 110a (e.g., BMC) communicatively couples with each of the compute nodes 115 (as depicted in FIG. 1 by the double-headed arrows between the controller 110a and each compute node 115. The controller 110a also communicatively couples with the cache-coherent interconnect node 120, via NIC 155 (as denoted by the double-headed arrow between the controller 110a and the NIC 155 through the ToR switch 110). The controller 110a further communicatively couples with network(s) 125, in some cases, with a compute fabric, a control plane, an orchestrator and/or data center control services, via network(s) 125. Network(s) 125 each includes at least one of a distributed computing network, such as the Internet, a private network, a commercial network, or a cloud network, and/or the like.

Figures 2A, 2B:
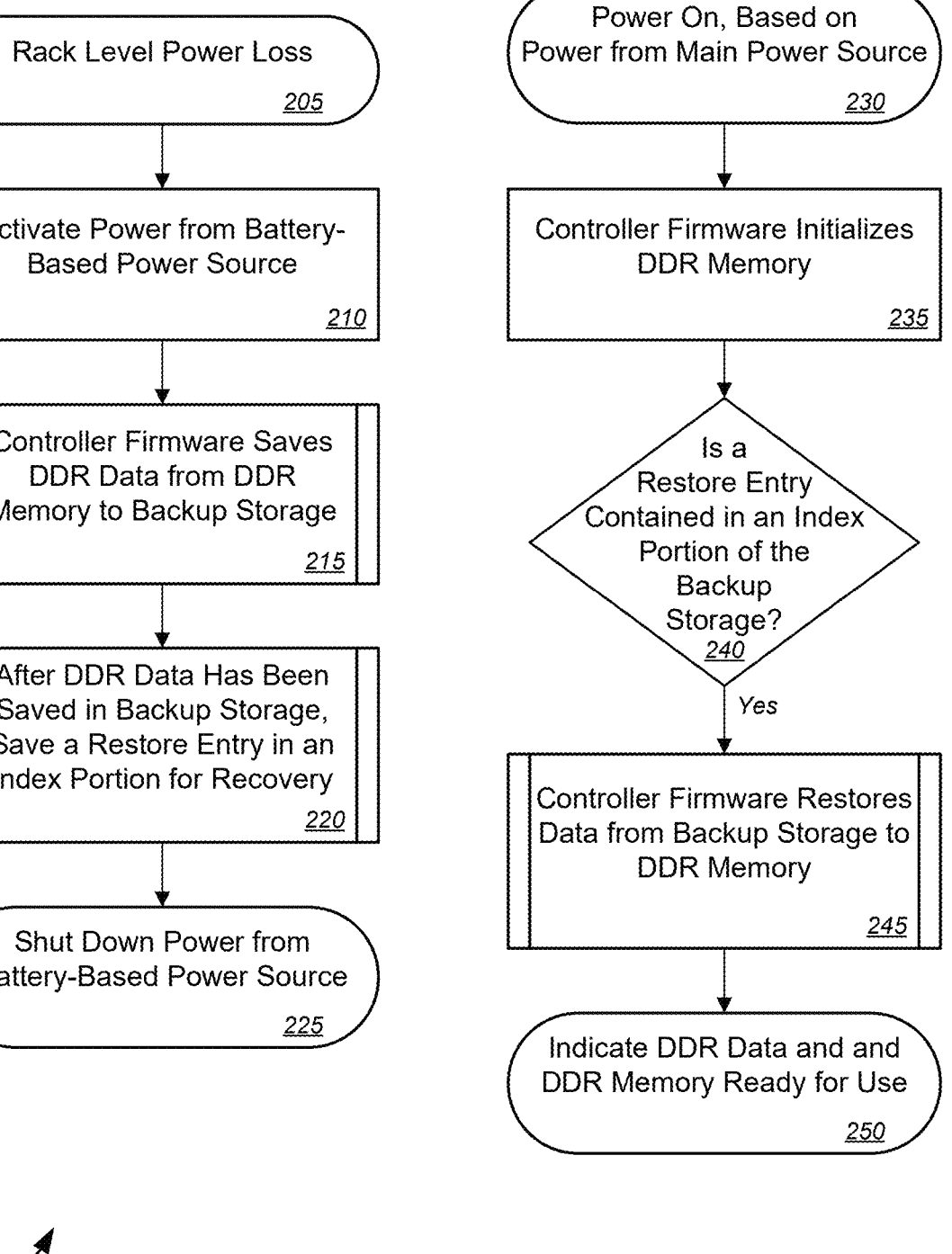
FIGS. 2A-2C depict various example sequence flows for implementing data backup and recovery using cache-coherent interconnect node-based non-volatile memory.
Figure 2C:
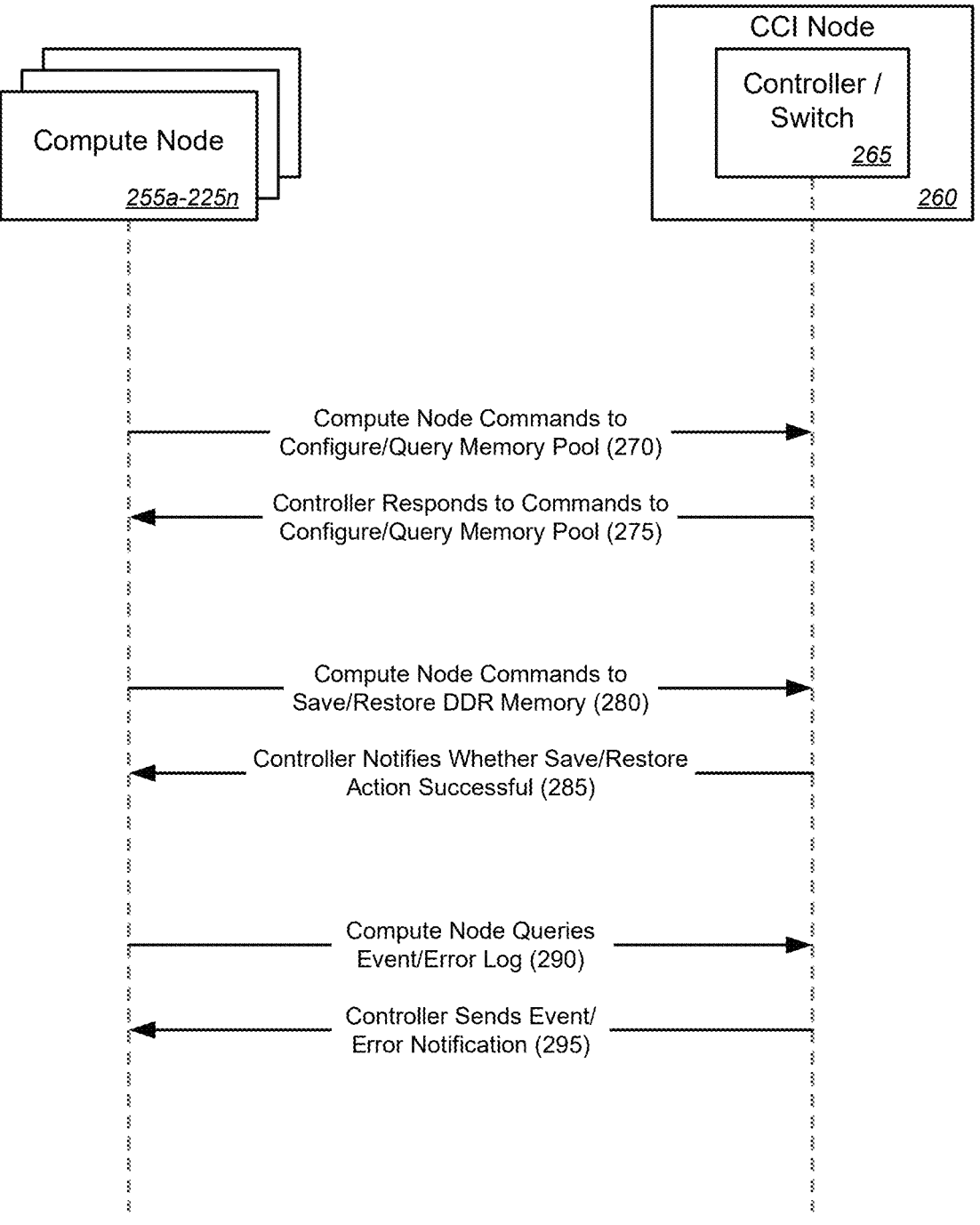

In operation, the controller 150 (or firmware 150a) of cache-coherent interconnect node 120 and/or the power circuitry 175a of the backup power supply 175 may perform methods for implementing data backup and recovery using cache-coherent interconnect node-based non-volatile memory, as described in detail with respect to FIGS. 2-4. For example, example sequence flows 200A-200C as described below with respect to FIGS. 2A-2C, and example methods 300 and 400 as described below with respect to FIGS. 3A-3D and 4A-4B, respectively, may be applied with respect to the operations of system 100 of FIG. 1. Herein, although the various embodiments refer to use of a BIOS, the various embodiments are not so limited, and unified extensible firmware interface ("UEFI") may be used instead. UEFI, as used herein, refers to a specification that defines architecture of a platform firmware that is used for booting computer hardware and its interface for interaction with an OS, or refers to the interface itself.

In some aspects, prior to the rack-level power loss (and/or after restoration from backup storage), the data 165 from a memory region 160a-160h is used by an OS 130 of a corresponding compute node 115a-115h to perform a task or a workload. In some examples, the task or workload includes at least one of a general computing task (e.g., general data processing or general computing), a cloud computing task (e.g., a large-scale data processing or computing task, or a virtual machine task), a gaming task (e.g., graphics processing and game engine tasks), or an artificial intelligence ("AI") processing task (e.g., natural language processing tasks (e.g., large language model or small language model tasks), computer vision tasks, content generation tasks, machine learning tasks, conversion between one of text, speech, image, video, or code to another of text, speech, image, video, or code).

In some other aspects, a cache-coherent interconnect node 120 (e.g., a CXL node) is configured to pre-allocate memory pool 160 (e.g., CXL memory or shared memory) and to pre-allocate backup storage system 180 (e.g., NVDIMM or NVDDR memory devices or backup memory) to each compute node 115a-115h in its rack 105. In examples, pre-allocation of memory regions 160a-160h of the memory pool 160, and/or of memory portions 180a-180h of backup storage system 180, is based on an identifier ("ID") of each compute node 115, where each compute node 115a-115h has a pre-allocated memory region 115a-115h that it can access in the cache-coherent interconnect node 120 using its compute node ID. For example, a first compute node 115a (with node ID 1) is pre-allocated a first memory region 160a have memory addresses 0-8 GB, while a second compute node 115b (with node ID 2) is pre-allocated a second memory region 160b have memory addresses 8-16 GB, through an $H^{th}$ compute node 115h (with node ID H) is pre-allocated an Hin memory region 160h have memory addresses (8×(H–1))–8×H GB. Here, H is any suitable non-negative integer value. Likewise, the first compute node 115a (with node ID 1) is pre-allocated a first memory portion 180a have memory addresses 0-8 GB, while a second compute node 115b (with node ID 2) is pre-allocated a second memory portion 180b have memory addresses 8-16 GB, through an $H^{th}$ compute node 115h (with node ID H) is pre-allocated an $H^{th}$ memory portion 180h have memory addresses (8×(H–1))–8λH GB. Each compute node 115 is connected to the cache-coherent interconnect node 120 via a cache-coherent interconnect link(s) (e.g., CCI or CXL link(s)). In examples, management component transport protocol ("MCTP"), which is a protocol that supports communications between different intelligent hardware components that make up a platform management subsystem and that provides monitoring and control functions inside a management computing system, is used over the CCI link(s) for direct configuration of a corresponding memory portion 160a-160h of the memory pool 160 by each compute node 115. Compute nodes 115a-115h do not have direct access to its corresponding memory portions 180a-180h of the backup storage system 180 or to the backup storage system 180 as a whole. Rather, compute nodes 115a-115h accesses the corresponding memory regions 160a-160h either before data 165 is saved or backed up as data 185 in the corresponding memory portions 180a-180h or after data 185 has been restored from memory portions 180a-180h as data 165 in the corresponding memory regions 160a-160h.

In an aspect, a CXL pooled memory (e.g., memory pool 160) is combined with storage in the form of CXL-attached NVJBOD (e.g., backup storage system 180 with JBOD style non-volatile memory devices) and full battery backup (e.g., battery-based power source 175b) to provide NVDIMM functionality and self-contained storage backup. The CXL-based memory and storage are partitioned using a CXL switch (e.g., controller 150, such as a JBOD management controller) that supports memory pooling, with each partitioned memory storage attached to and/or associated with individual service nodes (e.g., compute nodes 115a-115h) on the rack (e.g., rack 105). As long as rack-level power is maintained, the CXL-attached NVDIMM JBOD continues to provide data persistency. Any rack level power loss triggers processes to save the contents of the CXL pooled memory to the backup storage using the battery backup available just to the CXL JBOD. Data (e.g., data 145) that is stored in local memory 140, unless migrated or copied onto (and saved as data 165 in) the corresponding memory region 160a-160h is not saved or backed up to the CXL-attached NVJBOD. For any node-level events (including platform reset, node level crash, or system crash), except for rack-level power loss, the data stored in CXL pooled memory (e.g., memory pool 160) can, but need not, be saved to the CXL-attached NVJBOD.

FIGS. 2A-2C depict various example sequence flows for implementing data backup and recovery using cache-coherent interconnect node-based non-volatile memory. FIG. 2A is directed to saving or backing up data to cache-coherent interconnect node-based non-volatile memory due to rack level power loss. FIG. 2B is directed to restoring data from cache-coherent interconnect node-based non-volatile memory following power on after recovery from rack level power loss. FIG. 2C is directed to saving to and restoring from cache-coherent interconnect node-based non-volatile memory for at least one compute node (although not necessarily for all compute nodes in the rack).

With reference to example sequence flow 200A of FIG. 2A, at operation 205, rack level power loss (e.g., loss of power from main power supply 170 and/or rack power supply 170a of FIG. 1) occurs and/or is detected (e.g., by power circuitry 175a of backup power supply 175 of FIG. 1). At operation 210, the power that is stored in the backup power supply (e.g., power that is stored in a battery-based power source 175b of FIG. 1) is activated and used to power the cache-coherent interconnect node (e.g., cache-coherent interconnect node 120 of FIG. 1). More particularly, the activated power is used to power the cache-coherent interconnect controller (e.g., controller 150 of FIG. 1), the cache-coherent interconnect memory (e.g., memory pool 160 of FIG. 1), and the backup storage (e.g., backup storage system 180 of FIG. 1).

At operation 215, the cache-coherent interconnect controller (or its firmware, e.g., firmware 150a of controller 150 of FIG. 1) saves data (e.g., DDR data; e.g., data 165 of FIG. 1) from shared memory (e.g., DDR memory; e.g., memory regions 160a-160h of memory pool 160 of FIG. 1) to the backup storage, in particular to memory portions of the backup storage (e.g., memory portions 180a-180h of backup storage system 180 of FIG. 1). After the data has been saved in the backup storage, the cache-coherent interconnect controller saves a restore entry(ies) (in some cases, including metadata, e.g., metadata 195 of FIG. 1) in an index entry (e.g., index portion 190 of backup storage system 180 of FIG. 1) for later recovery (at operation 220). Due to limited battery capacity of the battery-based power source 175b, and because the main power supply 170 could be down or non-operation for prolonged periods (e.g., hours or days), at operation 225, the cache-coherent interconnect controller causes shut down of the backup power supply (e.g., causes the power circuitry 175a to shut down power from the battery-based power source 175b).

Referring to the example sequence flow 200B of FIG. 2B, at operation 230, power is restored (e.g., power restored from the main power supply 170 and/or rack power supply 170a) and/or a power-on state is detected (e.g., by power circuitry 175a). At operation 235, the cache-coherent interconnect controller (or its firmware) initializes the shared memory (e.g., DDR memory). In examples, initializing the shared memory (e.g., cache-coherent interconnect memory) includes retraining the memory devices (e.g., RAM, SRAM, DRAM, SDRAM, DDR memory, GDDR memory, or GDDR SDRAM) the form the memory pool. After initializing the cache-coherent interconnect memory, at operation 240, the cache-coherent interconnect controller determines whether a restore entry is saved in an index portion of the backup storage. The restore entry, if present, is indicative of at least one memory portion, among a plurality of memory portions, of the backup storage containing data that had been saved (e.g., at operation 215 of FIG. 2A) from a corresponding at least one memory region that was pre-allocated to a corresponding compute node of the plurality of compute nodes. Based on a determination that the at least one entry is saved in the index portion, at operation 245, the cache-coherent interconnect controller restores the data from the backup storage to the shared memory (e.g., the corresponding memory regions of the DDR memory or to the corresponding memory regions 160a-160h of the memory pool 160). After restoring the data into each corresponding memory region of the shared memory, the cache-coherent interconnect controller sends a notification to each corresponding compute node indicating that the data has been restored and/or that the data and the memory region are ready for use by the compute node.

Turning to the example sequence flow 200C of FIG. 2C, compute nodes 255a-255n (corresponding to compute nodes 115a-115h of FIG. 1) individually communicates with cache-coherent interconnect node 260 (corresponding to cache-coherent interconnect node 120 of FIG. 1) and/or its controller/switch 265 (corresponding to controller 150 of FIG. 1). For example, at operation 270, a compute node (e.g., compute node 255a) sends a command to controller/switch 265 of the cache-coherent interconnect node 260 to configure or query a memory pool! (e.g., memory pool 160 of FIG. 1). The controller/switch 265 responds to the commands (at operation 275), in some cases, by indicating successful or unsuccessful configuration of the memory pool or by returning a query response from the memory pool. In some examples, commands to configure or query the memory pool include a Get NVDIMM Capability Structure Command, a Partition NVDIMM Manageability Command, and a Purge NVDIMM Command. Example responses to the Get NVDIMM Capability Structure Command include an indication regarding whether NVDIMM is supported, memory pool size, error handling capability, battery back-up capability, back-up timing data. The Partition NVDIMM Manageability Command partitions available NVDIMM memory among various compute nodes of the rack, given the size and number of partitions. Example responses to the Partition NVDIMM Manageability Command include the number of partitions created and their sizes, as well as whether any error was raised during creation of the partitions. The Purge NVDIMM Command flushes contents of the cache hierarchy of a specific NVDIMM partition used by a specific compute node to the non-volatile storage of the backup storage.

At operation 280, a compute node (e.g., compute node 255b) sends a command to save or restore shared memory (e.g., DDR memory). That is, instead of the power loss at operation 205 of FIG. 2A or the power restoration at operation 210 of FIG. 2B, the trigger is the command sent from one of the compute nodes (in this case, compute node 255b). The cache-coherent interconnect node performs save operations similar to those at operations 215 and 220 of FIG. 2A, or performs restore operations similar to those at operations 235-250 of FIG. 2B. At operation 285, the cache-coherent interconnect node notifies the compute node whether the save or restore action was successful.

At operation 290, a compute node (e.g., compute node 255c) queries an event or error log. In examples, the event or error log tracks events or errors associated with server class memory reliability, availability, and serviceability ("RAS") features—such as error correcting code ("ECC"), spare memory banks, thermal management, bad page handling, and/or other such features-inside the firmware of the cache-coherent interconnect node (e.g., CXL NVDIMM node firmware) and exposes the RAS event to a corresponding compute node over the corresponding cache-coherent interconnect link. At operation 295, the cache-coherent interconnect node sends an event or error notification in response.

With reference to FIGS. 3A-3D and 4A-4B, the operations of example methods 300 and 400 may be performed by a cache-coherent interconnect controller or cache-coherent interconnect node (e.g., multi-port controller & switch 150 or 265 or cache-coherent interconnect node 120 or 260 of FIG. 1 or 2C) and/or by power circuitry of a backup power supply (e.g., power circuitry 175a of a backup power supply 175 of FIG. 1).

FIGS. 3A-3D depict an example method 300 for implementing data backup and recovery using cache-coherent interconnect node-based non-volatile memory. Method 300 of FIG. 3B continues onto FIG. 3A following the circular marker denoted, "A."

In the example of FIG. 3A, method 300, at operation 305, includes a cache-coherent interconnect controller receiving, from power circuitry of a backup power supply, a first signal indicating rack-level power loss from a main power supply (e.g., main power supply 170 of FIG. 1) to the plurality of compute nodes and the cache-coherent interconnect node and indicating that power is currently being supplied by a battery-based power source of the backup power supply. In examples, the backup power supply is disposed within the cache-coherent interconnect node.

At operation 310, the cache-coherent interconnect controller, in response to receiving the first signal (at operation 305), saves data from each memory region of a plurality of memory regions into a corresponding memory portion among a plurality of memory portions of a backup storage. Prior to the rack-level power loss, each memory region is pre-allocated to a corresponding compute node among the plurality of compute nodes, and is mapped to a local memory of the corresponding compute node. The backup storage is also disposed within the cache-coherent interconnect node. In examples, saving the data from each memory region into the corresponding memory portion of the backup storage (at operation 310) includes, for each memory region, one of:

(1) copying the data from that memory region into the corresponding memory portion;

(2) moving the data from that memory region into the corresponding memory portion, after which the data is no longer contained in that memory region; or

(3) determining a difference between data to be saved
from that memory region and data that is already stored
in the corresponding memory portion, and updating the
data that is already stored in the corresponding memory
portion by saving only the determined difference in the
corresponding memory portion.

In some examples, copying the data or moving the data (at
(1) or (2)) either replaces data that is already stored in the
corresponding memory portion or saves the data in an
unused segment of the corresponding memory portion. In
examples, saving the data from each memory region into the
corresponding memory portion (at operation 310) is per-
formed based on an optimization algorithm. An example of
the optimization algorithm includes an algorithm that tracks
dirty pages (e.g., pages in a memory buffer that has modified
data, but the modified data has not moved from memory to
disk) at a page level of granularity and writes only modified
pages (e.g., pages containing the modified data).

After saving the data from each memory region into the
corresponding memory portion, the cache-coherent inter-
connect controller saves an entry for each memory portion
in an index portion of the backup storage (at operation 315).
Each entry includes information indicating which memory
region or which compute node the data corresponds to. In
some examples, saving the entry for each memory portion in
the index portion of the backup storage (at operation 315)
includes saving metadata. In examples, the metadata
includes the information indicating which memory region or
which compute node the data corresponds to and further
includes additional information indicating an amount of data
being stored. After saving the entries for the plurality of
memory portions in the index portion of the backup storage,
the cache-coherent interconnect controller causes the power
circuitry to shut down the backup power supply (at operation
320).

Referring to FIG. 3B, at operation 325, method 300
further includes the power circuitry detecting power loss
from the main power supply that supplies power to the
plurality of compute nodes and the cache-coherent intercon-
nect node. At operation 330, in response to detecting the
power loss from the main power supply, the power circuitry
causes the battery-based power source to supply power to
the cache-coherent interconnect memory, the backup stor-
age, and the cache-coherent interconnect controller. The
power circuitry sends the first signal to the cache-coherent
interconnect controller (at operation 335). Method 300 con-
tinues onto the process at operation 305 in FIG. 3A, fol-
lowing the circular marker denoted, "A."

Turning to FIG. 3C, at operation 340, method 300 further
includes, after receiving power from the main power supply
and after powering up, the cache-coherent interconnect
controller initializing the cache-coherent interconnect
memory. At operation 345, after initializing the cache-
coherent interconnect memory, the cache-coherent intercon-
nect controller determines whether at least one entry is saved
in the index portion that is indicative of at least one memory
portion of the backup storage containing data that had been
saved from corresponding at least one memory region that
was pre-allocated to a corresponding compute node of the
plurality of compute nodes. At operation 350, based on a
determination that the at least one entry is saved in the index
portion, the cache-coherent interconnect controller restores
data saved in each memory portion into each corresponding
memory region of the plurality of memory regions of the
cache-coherent interconnect memory, based on the informa-
tion contained in the at least one entry. In some examples,
restoring the data is based on the information contained in metadata that is in the at least one entry. After restoring the
data into each corresponding memory region, the cache-
coherent interconnect controller sends a notification to each
corresponding compute node (at operation 355), the notifi-
cation indicating that the data has been restored and that the
data and the memory region are ready for use by the
compute node.

With reference to FIG. 3D, method 300 further includes
the cache-coherent interconnect controller receiving man-
agement commands from at least one of a baseboard man-
agement controller ("BMC"), an orchestrator, or a manage-
ability controller, via a NIC (at operation 360). At operation
365, the cache-coherent interconnect controller causes man-
agement changes based on the management commands. In
some examples, the management commands include one of:
(a) commands to manage partitioning of the memory pool
into the plurality of memory regions and allocation of
each memory region to one of the plurality of compute
nodes;
(b) commands to manage saving of data from each
memory region into the corresponding memory portion
triggered by receiving a power loss signal; or
(c) commands to manage handling of telemetry data from
at least one of the plurality of compute nodes, the
cache-coherent interconnect memory, the backup
power supply, or the backup storage.

FIGS. 4A and 4B depict another example method 400 for
implementing data backup and recovery using cache-coher-
ent interconnect node-based non-volatile memory. In the
example of FIG. 4A, method 400, at operation 405, includes
a cache-coherent interconnect controller detecting a first
trigger event associated with a first compute node among a
plurality of compute nodes. In some examples, the first
trigger event includes one of:
(A) a platform reset associated with at least the first
compute node;
(B) a node level crash associated with the first compute
node;
(C) a system crash associated with a first OS of the first
compute node;
(D) at least a portion of the first compute node entering a
repair state;
(E) power loss from a main power supply to at least the
first compute node; or
(F) receiving backup instructions from the first OS of the
first compute node.

At operation 410, in response to detecting the first trigger
event, the cache-coherent interconnect controller saves data
from a first memory region of a plurality of memory regions
into a first memory portion among a plurality of memory
portions of a backup storage. The first memory region is
mapped to the local memory of the first compute node. After
saving the data from the first memory region into the first
memory portion, the cache-coherent interconnect controller
saves a first entry for the first memory portion in an index
portion of the backup storage (at operation 415). In some
examples, the first entry includes metadata indicating which
memory region or which compute node the data corresponds
to. After saving the first entry for the first memory portion
in the index portion of the backup storage, the cache-
coherent interconnect controller sends a first notification
indicating successful saving of the data from the first
memory region into the first memory portion (at operation
420).

Turning to FIG. 4B, method 400, at operation 425,
includes a cache-coherent interconnect controller detecting a second trigger event associated with the first compute node. In some examples, the second trigger event includes one of:

(I) a restart of the first compute node following one of a platform reset associated with at least the first compute node, a node level crash associated with the first compute node, a system crash associated with a first OS of the first compute node, or at least a portion of the first compute node entering a repair state;

(II) power up of the first compute node following power loss from a main power supply to at least the first compute node; or (III) receiving restore instructions from the first OS of the first compute node.

At operation 430, in response to a second trigger event associated with the first compute node, the cache-coherent interconnect controller determines whether an entry is saved in the index portion that is indicative of the first memory portion of the backup storage containing data that had been saved from the first memory region that was pre-allocated to the first compute node. Based on a determination that the first entry is saved in the index portion, the cache-coherent interconnect controller restores data saved in the first memory portion into the first memory region of the plurality of memory regions of the cache-coherent interconnect memory (at operation 435). In cases where metadata is included in the first entry, restoring the data saved in the first memory into the first memory region is based on the metadata included in the first entry. After restoring the data into the first memory region, the cache-coherent interconnect controller sends a notification to the first compute node (at operation 440). The notification, in some examples, indicates that the data has been restored, that the data, and/or that the first memory region are ready for use by the first compute node.

While the techniques and procedures in methods 300, 400 are depicted and/or described in a certain order for purposes of illustration, it should be appreciated that certain procedures may be reordered and/or omitted within the scope of various embodiments. Moreover, while the methods 300, 400 may be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the methods 300, 400 (e.g., by executing instructions embodied on a computer readable medium), the systems, examples, or embodiments 100 and 200 of FIGS. 1 and 2 can each also operate according to other modes of operation and/or perform other suitable procedures.

As should be appreciated from the foregoing, the present technology provides multiple technical benefits and solutions to technical problems. For instance, data backup and recovery for data center servers or compute nodes generally raises multiple technical problems. For instance, existing solutions utilize node-level battery backup for data backup using the node's DDR memory. One technical problem is that reliance on node-level battery backup poses a potential risk to data integrity and availability, as power loss at the node level results in data loss by the local DDR memory. Another technical problem is that the existing solution is fragmented due to divergences specific to host CPU architectures. For instance, Intel® and AMD® utilize a BIOS for NVDIMM DDR save and/or restore operations, while Arm and DPU employ a microcontroller-based save and/or restore solution. This fragmentation results in a lack of uniformity across different architectures, thereby impeding the scalability of the existing solution. Yet another technical problem is that, because any node level failure results in data loss, maintenance becomes a nightmare to manage.

The present technology provides for data backup and recovery using cache-coherent interconnect node-based non-volatile memory. By using a cache-coherent interconnect node-based backup storage in addition to cache-coherent interconnect node-based shared memory and battery-based backup power, instead of multiple compute node level battery backup and data backup, the present technology overcomes the issues with the existing node-level solution. Further, instead of compute node level power loss or recovery, the present technology uses rack level power loss or power restoration as the trigger for performing save or restore operations, respectively. Moreover, the cache-coherent interconnect node-based save and restore operations are independent of CPU architectures, as they are activated automatically based on rack level power loss and power restoration, respectively. In this manner, a scalable solution is enabled that is agnostic of host CPU architectures, and can work and scale well on any compute design and any rack design, with the usage of the cache-coherent interconnect memory pool. In sum, the present technology provides a cache-coherent interconnect node NV memory solution for data backup and recover that is unified, scalable, and reliable, and that improves the overall functionality and efficiency of the system.

Figure 5:
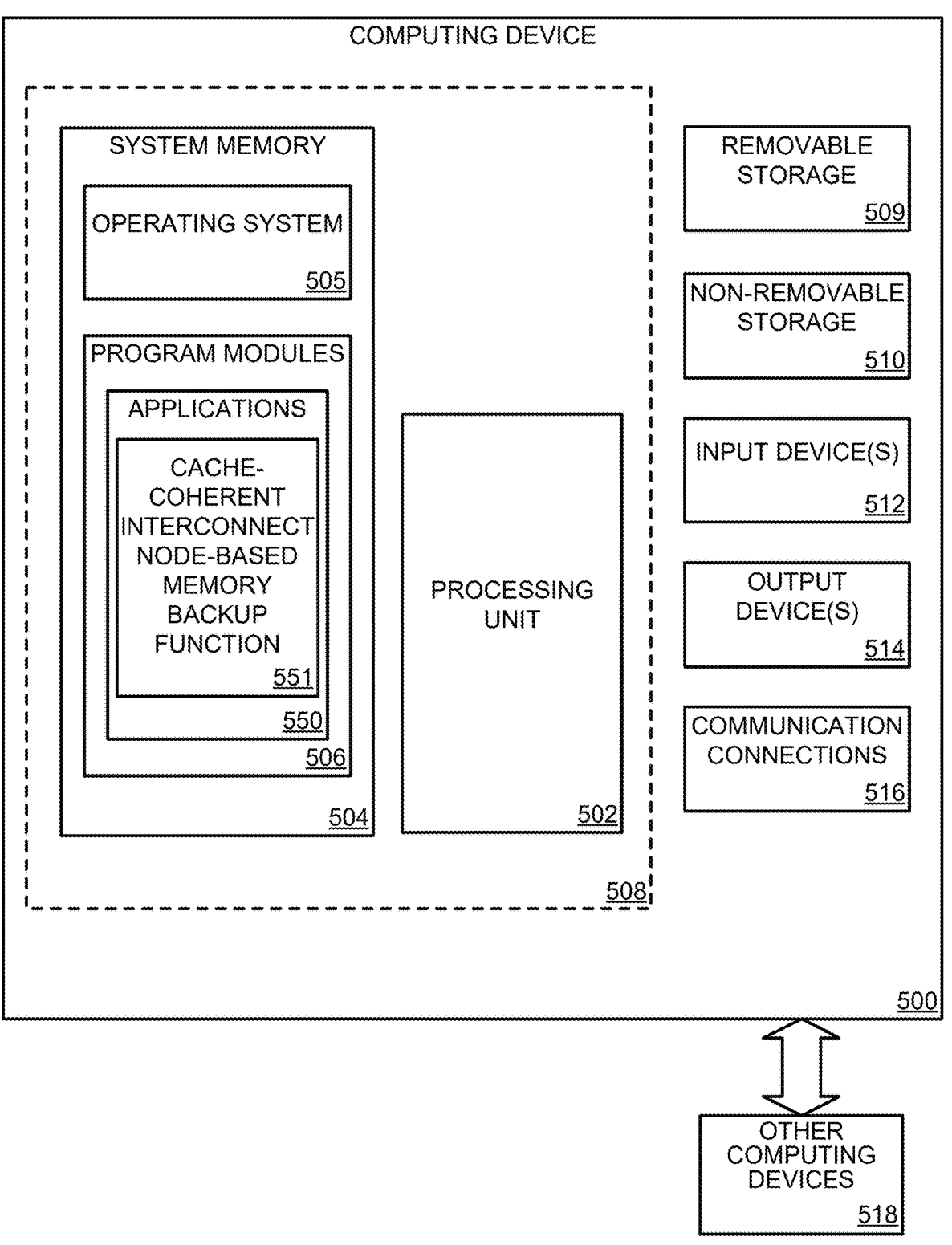
FIG. 5 depicts a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the data backup and recovery using the cache-coherent interconnect node-based non-volatile memory, as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as cache-coherent interconnect node-based memory backup function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules

506 may perform processes including one or more of the operations of the method(s) as illustrated in FIGS. 3A-4B, or one or more operations of the system(s) and/or apparatus(es) as described with respect to FIGS. 1-2C, or the like. Other program modules that may be used in accordance with examples of the present disclosure may include applications such as electronic mail and contacts applications, word processing applications, spreadsheet applications, database applications, slide presentation applications, drawing or computer-aided application programs, AI applications and machine learning ("ML") modules on cloud-based systems, etc.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device, etc. The output device(s) 514 such as a display, speakers, and/or a printer, etc. may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EE-PROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05$a$-X05$n$, the integer value of n in X05$n$ may be the same or different from the integer value of n in X10$n$ for component #2 X10$a$-X10$n$, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a plurality of compute nodes mounted on an equipment rack, each compute node comprising an operating system ("OS") and a local memory; and
a cache-coherent interconnect node that is mounted on the equipment rack and that is communicatively coupled to each of the plurality of compute nodes, the cache-coherent interconnect node comprising:
a backup power supply comprising power circuitry and a battery-based power source;
a cache-coherent interconnect memory including memory devices forming a memory pool that is partitioned into a plurality of memory regions each pre-allocated to one of the plurality of compute nodes;

a backup storage comprising a plurality of memory portions and an index portion; and
a cache-coherent interconnect controller;
wherein the cache-coherent interconnect controller executes code that causes the cache-coherent interconnect controller to perform first operations comprising:
receiving, from the power circuitry, a first signal indicating rack-level power loss from a main power supply to the plurality of compute nodes and the cache-coherent interconnect node and indicating that power is currently being supplied by the battery-based power source;
in response to receiving the first signal, saving data from each memory region of the plurality of memory regions into a corresponding memory portion among the plurality of memory portions of the backup storage, wherein, prior to the rack-level power loss, each memory region is mapped to the local memory of a corresponding compute node among the plurality of compute nodes;
after saving the data from each memory region into the corresponding memory portion, saving an entry for each memory portion in the index portion of the backup storage, each entry including information indicating which memory region or which compute node the data corresponds to; and
after saving the entries for the plurality of memory portions in the index portion of the backup storage, causing the power circuitry to shut down the backup power supply.

2. The system of claim 1, wherein the power circuitry that performs second operations comprising:
detecting power loss from the main power supply that supplies power to the plurality of compute nodes and the cache-coherent interconnect node; and
in response to detecting the power loss from the main power supply,
causing the battery-based power source to supply power to the cache-coherent interconnect memory, the backup storage, and the cache-coherent interconnect controller; and
sending the first signal to the cache-coherent interconnect controller.

3. The system of claim 1, wherein saving the data from each memory region into the corresponding memory portion of the backup storage comprises, for each memory region, one of:
copying the data from that memory region into the corresponding memory portion;
moving the data from that memory region into the corresponding memory portion, after which the data is no longer contained in that memory region; or
determining a difference between data to be saved from that memory region and data that is already stored in the corresponding memory portion, and updating the data that is already stored in the corresponding memory portion by saving only the determined difference in the corresponding memory portion;
wherein copying the data or moving the data either replaces data that is already stored in the corresponding memory portion or saves the data in an unused segment of the corresponding memory portion.

4. The system of claim 3, wherein saving the data from each memory region into the corresponding memory portion is performed based on an optimization algorithm.

5. The system of claim 1, wherein, prior to the rack-level power loss, the data from each memory region is useable by the OS of the corresponding compute node to perform a task including one of a general computing task, a cloud computing task, a gaming task, or an artificial intelligence ("AI") processing task.

6. The system of claim 1, wherein saving the entry for each memory portion in the index portion of the backup storage includes saving metadata, the metadata including the information indicating which memory region or which compute node the data corresponds to and further including additional information indicating an amount of data being stored.

7. The system of claim 6, wherein the first operations further comprise:

after receiving power from the main power supply and after powering up, initializing the cache-coherent interconnect memory;

after initializing the cache-coherent interconnect memory, determining whether at least one entry is saved in the index portion that is indicative of at least one memory portion of the backup storage containing data that had been saved from corresponding at least one memory region that was pre-allocated to a corresponding compute node of the plurality of compute nodes;

based on a determination that the at least one entry is saved in the index portion, restoring data saved in each memory portion into each corresponding memory region of the plurality of memory regions of the cache-coherent interconnect memory, based on the information contained in the metadata included in the at least one entry; and after restoring the data into each corresponding memory region, sending a notification to each corresponding compute node indicating that the data has been restored and that the data and the memory region are ready for use by the compute node.

8. The system of claim 7, wherein the memory devices include at least one of a random access memory ("RAM"), a static RAM ("SRAM"), a dynamic RAM ("DRAM"), a synchronous dynamic RAM ("SDRAM"), a double data rate ("DDR") memory, a graphics DDR ("GDDR") memory, or a GDDR SDRAM, wherein initializing the cache-coherent interconnect memory includes retraining the memory devices.

9. The system of claim 1, wherein the cache-coherent interconnect node further comprises:

a network interface card ("NIC") that is communicatively couple to the cache-coherent interconnect controller;

wherein the first operations further comprise:

receiving, via the NIC, management commands from at least one of a baseboard management controller ("BMC"), an orchestrator, or a manageability controller; and causing management changes based on the management commands.

10. The system of claim 9, wherein the management commands include one of:

commands to manage partitioning of the memory pool into the plurality of memory regions and allocation of each memory region to one of the plurality of compute nodes;

commands to manage saving of data from each memory region into the corresponding memory portion triggered by receiving a power loss signal; or commands to manage handling of telemetry data from at least one of the plurality of compute nodes, the cache-coherent interconnect memory, the backup power supply, or the backup storage.

11. A computer-implemented method, comprising:

after receiving power from a main power supply and after powering up, initializing, by a cache-coherent interconnect controller of a cache-coherent interconnect node, a cache-coherent interconnect memory of the cache-coherent interconnect node, the cache-coherent interconnect memory including memory devices forming a memory pool that is partitioned into a plurality of memory regions each pre-allocated to one of a plurality of compute nodes;

after initializing the cache-coherent interconnect memory, determining, by the cache-coherent interconnect controller, whether at least one entry is saved in an index portion of a backup storage and is indicative of at least one memory portion, among a plurality of memory portions, of the backup storage containing data that had been saved from a corresponding at least one memory region that was pre-allocated to a corresponding compute node of the plurality of compute nodes;

based on a determination that the at least one entry is saved in the index portion, restoring, by the cache-coherent interconnect controller, data saved in each memory portion into each corresponding memory region of the plurality of memory regions of the cache-coherent interconnect memory, based on information contained in the at least one entry; and after restoring the data into each corresponding memory region, sending, by the cache-coherent interconnect controller, a notification to each corresponding compute node indicating that the data has been restored and that the data and the memory region are ready for use by the compute node.

12. The computer-implemented method of claim 11, further comprising:

receiving, by the cache-coherent interconnect controller and from power circuitry of a backup power supply, a first signal indicating rack-level power loss from a main power supply to the plurality of compute nodes and the cache-coherent interconnect node and indicating that power is currently being supplied by a battery-based power source of the backup power supply;

in response to receiving the first signal, saving, by the cache-coherent interconnect controller, data from each memory region of the plurality of memory regions into a corresponding memory portion among the plurality of memory portions of the backup storage, wherein, prior to the rack-level power loss, each memory region is mapped to a local memory of a corresponding compute node among the plurality of compute nodes;

after saving the data from each memory region into the corresponding memory portion, saving, by the cache-coherent interconnect controller, an entry for each memory portion in the index portion of the backup storage, each entry including information indicating which memory region or which compute node the data corresponds to; and after saving the entries for the plurality of memory portions in the index portion of the backup storage, causing, by the cache-coherent interconnect controller, the power circuitry to shut down the backup power supply.

13. The computer-implemented method of claim 12, wherein, prior to the rack-level power loss, the data from each memory region is useable by an operating system ("OS") of the corresponding compute node to perform a task including one of a general computing task, a cloud computing task, a gaming task, or an artificial intelligence ("AI") processing task.

14. The computer-implemented method of claim 12, wherein saving the entry for each memory portion in the index portion of the backup storage includes saving metadata, the metadata including the information indicating which memory region or which compute node the data corresponds to and further including additional information indicating an amount of data being stored.

15. The computer-implemented method of claim 12, wherein saving the data from each memory region into the corresponding memory portion of the backup storage comprises, for each memory region, one of:

copying the data from that memory region into the corresponding memory portion;

moving the data from that memory region into the corresponding memory portion, after which the data is no longer contained in that memory region; or determining a difference between data to be saved from that memory region and data that is already stored in the corresponding memory portion, and updating the data that is already stored in the corresponding memory portion by saving only the determined difference in the corresponding memory portion;

wherein copying the data or moving the data either replaces data that is already stored in the corresponding memory portion or saves the data in an unused segment of the corresponding memory portion.

16. The computer-implemented method of claim 11, further comprising:

receiving, by the cache-coherent interconnect controller and via a network interface card ("NIC") that is communicatively couple to the cache-coherent interconnect controller, management commands from at least one of a baseboard management controller ("BMC"), an orchestrator, or a manageability controller; and causing, by the cache-coherent interconnect controller, management changes based on the management commands;

wherein the management commands include one of:

commands to manage partitioning of the memory pool into the plurality of memory regions and allocation of each memory region to one of the plurality of compute nodes;

commands to manage saving of data from each memory region into the corresponding memory portion triggered by receiving a power loss signal; or commands to manage handling of telemetry data from at least one of the plurality of compute nodes, the cache-coherent interconnect memory, a backup power supply, or the backup storage.

17. A system, comprising:

a plurality of compute nodes mounted on an equipment rack, each compute node comprising an operating system ("OS") and a local memory; and a cache-coherent interconnect node that is mounted on the equipment rack and that is communicatively coupled to each of the plurality of compute nodes, the cache-coherent interconnect node comprising:

a backup power supply comprising power circuitry and a battery-based power source;

a cache-coherent interconnect memory including memory devices forming a memory pool that is partitioned into a plurality of memory regions each pre-allocated to one of the plurality of compute nodes;

a backup storage comprising a plurality of memory portions and an index portion; and a cache-coherent interconnect controller;

wherein the cache-coherent interconnect controller executes code that causes the cache-coherent interconnect controller to perform operations comprising:

in response to a first trigger event associated with a first compute node among the plurality of compute nodes, saving data from a first memory region of the plurality of memory regions into a first memory portion among the plurality of memory portions of the backup storage, wherein the first memory region is mapped to the local memory of the first compute node;

after saving the data from the first memory region into the first memory portion, saving a first entry for the first memory portion in the index portion of the backup storage, the first entry including metadata indicating which memory region or which compute node the data corresponds to; and after saving the first entry for the first memory portion in the index portion of the backup storage, sending a first notification indicating successful saving of the data from the first memory region into the first memory portion.

18. The system of claim 17, wherein the first trigger event includes one of:

a platform reset associated with at least the first compute node;

a node level crash associated with the first compute node;

a system crash associated with a first OS of the first compute node;

at least a portion of the first compute node entering a repair state;

power loss from a main power supply to at least the first compute node; or receiving backup instructions from the first OS of the first compute node.

19. The system of claim 17, wherein the operations further comprise:

in response to a second trigger event associated with the first compute node, determining whether an entry is saved in the index portion that is indicative of the first memory portion of the backup storage containing data that had been saved from the first memory region that was pre-allocated to the first compute node;

based on a determination that the first entry is saved in the index portion, restoring data saved in the first memory portion into the first memory region of the plurality of memory regions of the cache-coherent interconnect memory, based on the metadata included in the first entry; and after restoring the data into the first memory region, sending a notification to the first compute node indicating that the data has been restored and that the data and the first memory region are ready for use by the first compute node.

20. The system of claim 19, wherein the second trigger event includes one of:

a restart of the first compute node following one of a platform reset associated with at least the first compute node, a node level crash associated with the first compute node, a system crash associated with a first OS of the first compute node, or at least a portion of the first compute node entering a repair state;

power up of the first compute node following power loss from a main power supply to at least the first compute node; or receiving restore instructions from the first OS of the first compute node.

\* \* \* \* \*

24